H. E. HOOVER.
LUBRICATING SYSTEM.
APPLICATION FILED JULY 14, 1916.

1,227,141.

Patented May 22, 1917.

Witnesses:
Edward T. Wray.
Minnie M. Lindeman.

Inventor
H. Earl Hoover.
by Parker & Carter
Attorneys.

UNITED STATES PATENT OFFICE.

HOWARD EARL HOOVER, OF CHICAGO, ILLINOIS.

LUBRICATING SYSTEM.

1,227,141.  Specification of Letters Patent.  Patented May 22, 1917.

Application filed July 14, 1916. Serial No. 109,286.

*To all whom it may concern:*

Be it known that I, HOWARD EARL HOOVER, a citizen of the United States, residing at Chicago, in the county of Cook and State of Illinois, have invented a certain new and useful Improvement in Lubricating Systems, of which the following is a specification.

My invention relates to means for controlling and disposing of the lubricant used in connection with rotating parts, and has reference particularly to the lubricating system of a vertical shaft motor, and particularly to the same when employed in connection with a vacuum cleaner.

The invention is illustrated in one of its applications in the accompanying drawings, wherein—

Like parts are indicated by the same letters in all the figures.

A is the base and $A^1$ the side or cylindrical portion of the case. $A^2$ is a yoke secured in any desired manner to the upper edge of the cylindrical portion; and $A^3$ is a preferably sheet metal cap inclosing the yoke and completing the case.

B is the armature of the motor mounted on the hollow shaft $B^1$. This shaft is shouldered at $B^2$, provided with a flange $B^3$ and projects at $B^4$ into the fan chamber C. This chamber has a dust inlet at $C^1$ and a dust outlet at $C^2$, and in the chamber on the shaft is the fan $C^3$. I do not show or describe the remaining parts of the device. It is sufficient for my purpose that there is a dust chamber C through which the dust laden air is passed by means of the fan $C^3$, and into which the shaft end projects. The projecting part of the shaft is preferably of slightly smaller diameter than the upper portion of the shaft.

D is an upper bearing sleeve closely fitting in a recess in the yoke $A^2$, and held in position by the set screw $D^1$.

E is a lower bearing sleeve flanged at $E^1$ and passing through an aperture in the bottom or base A of the case.

F is a washer interposed between the lower end of the upper bearing sleeve D and the shoulder at $B^2$ on the hollow shaft, and $F^1$ is a washer between the flanges $B^3$ and $E^1$. By varying the number or size or thickness of these washers the shaft may be properly positioned so as to prevent vertical vibration or movement.

The yoke $A^2$ has a funnel-shaped recess G at its upper end with a perforation $G^1$ in the bottom in proximity to the disk $G^2$ which is made of lubricant permeable material. This disk serves the purpose of a lubricant distributer, and overlies the central aperture of the hollow shaft and also the annular bearing space between the hollow shaft and the upper bearing sleeve D.

J is a cup, shaped as shown, with a flat disk-like portion, surrounding and permanently secured to the shaft, and an annular cup-like portion $J^1$ as indicated. $J^2$ is a downwardly and inwardly inclined hole through the wall of the hollow shaft and opening into the cup near the hollow shaft and below the shoulder and washer. $J^3$ is a wick in the hollow of the shaft extending preferably from the closed bottom of the hollow shaft to a point just below the hole $J^2$.

K, K are set screws which hold the cap in position and $K^1$ is an annular packing ring let into a corresponding annular recess in the top of the yoke, and $K^2$ is an upwardly projecting portion of the yoke which projects through the central aperture in the cap.

Figure 1:
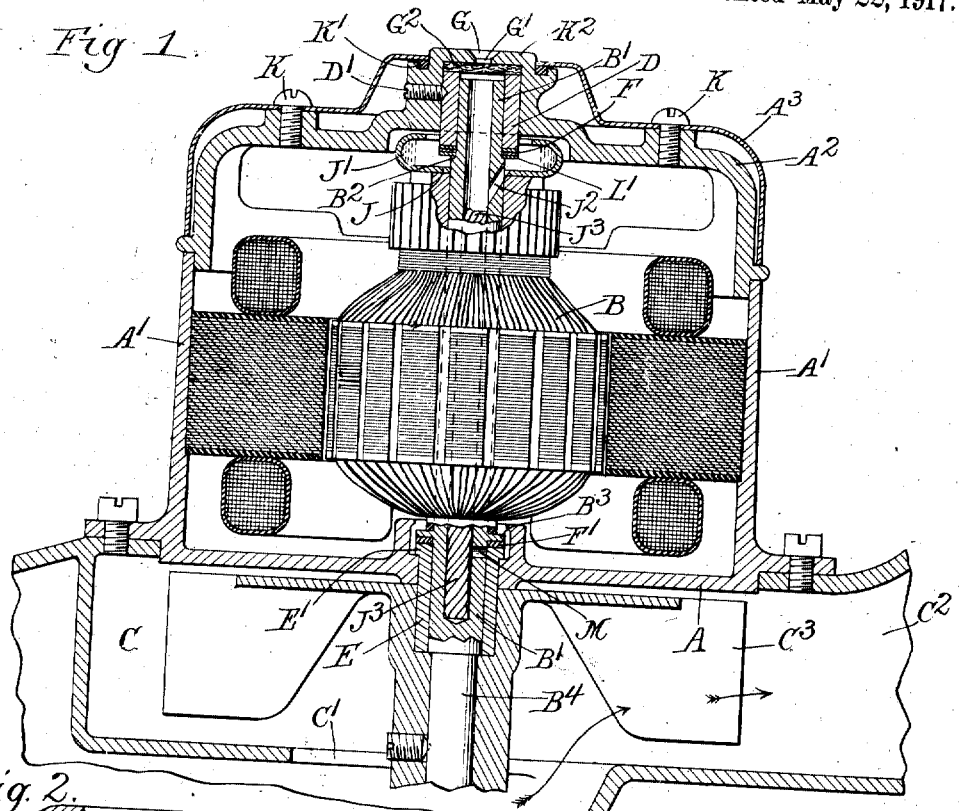
Figure 1 is a vertical section with parts shown in full lines through a motor and inclosing case associated with a vacuum cleaner.
Figure 2:
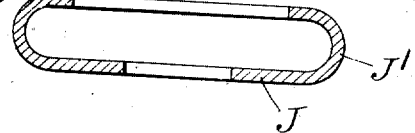
Fig. 2 is an enlarged detail of the lubricant cup.
Figure 4:
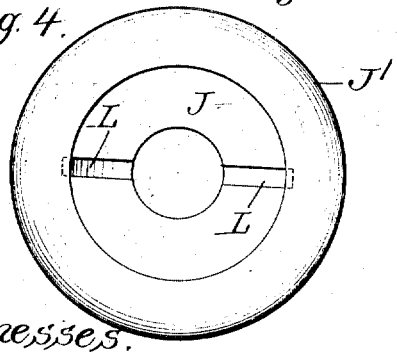
Fig. 4 is a plan view of the same.
Figure 3:
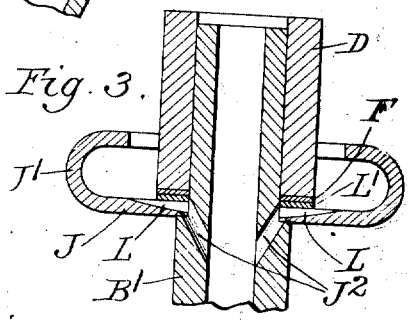
Fig. 3 is a detail vertical section of a modification of a cup and associated parts.
Figure 5:
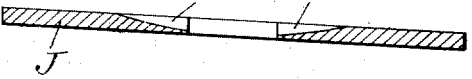
Fig. 5 is a detail cross section through the cup plate, before the cup is shaped.

In the modification shown in Figs. 3 and 4, the cup J rests on a shoulder on the hollow shaft, and it is provided with inwardly inclined grooves L, L. A washer $L^1$ is both in the modification and in the form shown in Fig. 1 placed beneath the washer F used in both cases. This washer serves to hold the washer F in position but in the modification it is placed on the bottom of the cup and since the grooves L, L are longer than the width of the washer, apertures are made from the cup beneath the washer to the hollow shaft.

M is an aperture through the side of the lower portion of the hollow shaft whereby the lubricant in the hollow where it enters from the top of the shaft or from the aperture in the bottom of the cup may pass outwardly into the lower bearing and thus downwardly into the dust chamber.

It is obvious that these several parts can be greatly altered in respect to size, shape, proportion and arrangement without departing from the spirit of my invention. I particularly call attention to the fact that the passageway from the oil cup to the dust chamber in this case includes the hollow of the shaft, though downward extension from the cup to the discharge into the dust chamber could be made by any other convenient channel. I here use the inner channel of the hollow tube because it is a convenient means, and because it permits the re-use of the lubricating fluid, for the lubricant which has first lubricated the upper bearing before it enters the cup can pass down through the wick and out into the lower bearing to assist in lubricating that part.

The use and operation of my invention are as follows:

Considering my invention as a means for preventing the escape of the lubricant into the mechanism or onto the surfaces of the parts within the case, as for example, the commutator surface, and as a means for preventing the escape of the lubricant from the filling part into the interior of the case, it comprises the oil cup which incloses the opening about the upper bearing sleeve and the packing ring which closes the opening which might otherwise be formed between the yoke which contains the lubricant distributing ring and the case.

This packing ring prevents the escape of any of the lubricant into the inside of the case, and the cup prevents the escape of any of the lubricant into the mechanism.

Considered as a means for conducting the lubricant away from the upper bearing in a vertical shaft device, my invention comprises the cup which surrounds the lower end of such bearing, receives the lubricant escaped therefrom, prevents it from escaping laterally by action of centrifugal force, and directs it downwardly in this case through the central aperture of the shaft to the discharge outlet.

Considered as a means for finally disposing of all used lubricant in a vertical shaft device, and particularly in a vacuum cleaner, my invention comprises one or more passages whereby the lubricant is circulated from the bearings directly or from one bearing to another, and then into a dust charged chamber, through which a current of air is being passed, whereby the lubricant is taken out or incorporated with the dust, and in this form is carried away so that it can be easily disposed of.

The lubricant is poured through the aperture in the top of the yoke on to the lubricant distributing ring and through that ring it is discharged into the inner perforation of the hollow shaft where it falls upon the wick, and thence down therealong until it passes out through the lateral aperture in the wall of the hollow shaft to the lower bearing. Here it performs a lubricating function and finally escapes into the dust chamber and is carried away by the dust with which it is incorporated.

The lubricant distributer disk at the same time deposits lubricant on the bearing surfaces between the upper end of the hollow shaft and the upper bearing sleeve. Such lubricant passes down between the parts out between the washers, or between the opposed surfaces of the shoulder on the shaft and the bearing sleeve, into the cup. When the parts are rotating, this lubricant is carried by centrifugal force to the outer part of the annular portion of the cup where it is accumulated as rapidly as it escapes. The proportions of the parts are such that this cup will never in practical operation be full of such used lubricant. When the parts come to rest the lubricant drops to the bottom of the cup and is immediately drained away by the aperture from the bottom of the cup into a passage which discharges such used lubricant into the dust chamber. For convenience, when the parts are arranged as here illustrated, the used lubricant is discharged from the cup into the inner chamber of the hollow shaft, whence it passes along with the unused lubricant through the aperture in the lower part of the hollow shaft into the bearing between the hollow shaft and the lower sleeve. Through this bearing it gradually descends until it is discharged into the dust chamber.

Thus I provide a kind of double conduit or a conduit consisting of two parts at one end and one part at the other, though this particular arrangement is not essential to my invention, whereby the lubricant is held in such conduit and passed therealong so that it lubricates one or both of the bearings and is finally discharged into the dust chamber.

I claim:

1. A rotating part having a shaft with two bearings, a dust chamber with means for driving a current of dust laden air therethrough, a lubricant conduit way including the lower of said bearings and discharging into the dust chamber, and means for retarding the lubricant in such conduit as it moves therethrough.

2. A rotating part having a shaft with two bearings, a dust chamber with means for driving a current of dust laden air therethrough, a lubricant conduit way including both bearings and discharging into the dust chamber.

3. A rotating part having a shaft with two bearings, a dust chamber with means for driving a current of dust laden air therethrough, a lubricant conduit way including both bearings and discharging into the dust chamber and means for retaining the lubricant in such conduit as it moves therealong.

4. A rotating part having a shaft with two bearings, a dust chamber with means for driving a current of dust laden air therethrough, a lubricant conduit way including both bearings and discharging into the dust chamber and means for retarding the lubricant in such conduit as it moves therethrough.

5. A rotating part having a shaft with two bearings, a dust chamber with means for driving a current of dust laden air therethrough, a lubricant conduit way including both bearings and discharging into the dust chamber and a cup surrounding one of said bearings and adapted to retain the lubricant therein when the rotating part is in motion.

6. A rotating part having a shaft with two bearings, a dust chamber with means for driving a current of dust laden air therethrough, a lubricant conduit way including both bearings and discharging into the dust chamber and a cup surrounding one of said bearings and adapted to retain the lubricant therein when the rotating part is in motion and means for retarding the lubricant in such conduit as it moves therethrough.

7. A rotating part having a hollow shaft with two bearings, a cup surrounding the discharge end of one of said bearings and adapted to retain the used lubricant while it is rotating, and a conduit way including an outlet from the cup into the hollow shaft through which said lubricant is discharged while the cup is at rest into the hollow of the shaft and a passageway from the inside of the hollow shaft to the other bearing.

8. A rotating part in combination with a lubricant supply chamber, direct connections therefrom one to one bearing and the other to the other, a passageway leading from the first bearing to the connection which leads to the second and a discharge passageway leading from the second bearing.

9. A rotating part having a hollow shaft with two bearings, an oil supply receptacle connected with the hollow shaft and with one of said bearings, a passageway from such bearing to the hollow shaft and a passageway from said hollow shaft to the other bearing and a discharge passage from said last mentioned bearing.

10. A rotating part having a hollow shaft with two bearings, a cup surrounding the discharge end of one of said bearings and adapted to retain the used lubricant while it is rotating, a conduit including an outlet from the cup into the hollow shaft through which said lubricant is discharged while the cup is at rest into the hollow of the shaft, a passageway from the inside of the hollow shaft to the other bearing, and a dust chamber with means for driving a current of dust-laden air therethrough.

11. A vertical rotating part having a hollow shaft with upper and lower bearings, means for introducing lubricant at the upper end of the shaft into the hollow of the shaft and into the upper bearing, a cup surrounding the discharge end of said upper bearing and adapted to retain the used lubricant while it is rotating, a passageway leading from such cup into the hollow shaft and an outlet from the lower end of the hollow shaft into the lower bearing whereby all the lubricant is confined to such system which includes both bearings and the hollow of the shaft.

12. A vertical rotating part having a hollow shaft with upper and lower bearings, means for introducing lubricant at the upper end of the shaft into the hollow of the shaft and into the upper bearing, a cup surrounding the discharge end of said upper bearing and adapted to retain the used lubricant while it is rotating, an aperture leading from such cup into the hollow shaft and an outlet from the lower end of the hollow shaft into the lower bearing whereby all the lubricant is confined to such system which includes both bearings and the hollow of the shaft, and a dust chamber with means for driving a current of dust-laden air therethrough, said lower bearing discharging into such dust chamber.

13. The combination of a removable motor case cap with a motor frame part which projects through the cap and is associated with the motor parts, a lubricant opening through such projecting part, a conduit, whereby the lubricant is passed through the motor bearings and out of the case and a packing between the frame part and the cap.

In testimony whereof, I affix my signature in the presence of two witnesses this 12th day of July 1916.

H. EARL HOOVER.

Witnesses:
  MINNIE M. LINDENAU,
  LAUREL M. DOREMUS.